(12) United States Patent
Hoerz et al.

(10) Patent No.: US 11,777,352 B2
(45) Date of Patent: Oct. 3, 2023

(54) ELECTRICAL MACHINE

(71) Applicant: Mahle International GmbH, Stuttgart (DE)

(72) Inventors: Mirko Hoerz, Esslingen (DE); Hans-Ulrich Steurer, Stuttgart (DE); Josef Sonntag, Nuertingen (DE); Stojan Markic, Kojsko (SI); Andrej Licen, Branik (SI); Aleks Medvescek, Rence (SI); Peter Sever, Murska Sobota (SI); Philip Grabherr, Stuttgart (DE)

(73) Assignee: Mahle Internationl GmbH

( * ) Notice: Subject to any disclaimer, the term of this patent is extended or adjusted under 35 U.S.C. 154(b) by 548 days.

(21) Appl. No.: 16/614,797

(22) PCT Filed: May 18, 2018

(86) PCT No.: PCT/EP2018/063140
§ 371 (c)(1),
(2) Date: Nov. 18, 2019

(87) PCT Pub. No.: WO2018/211088
PCT Pub. Date: Nov. 22, 2018

(65) Prior Publication Data
US 2021/0296954 A1 Sep. 23, 2021

(30) Foreign Application Priority Data
May 19, 2017 (DE) .......................... 102017208556.8

(51) Int. Cl.
*H02K 3/24* (2006.01)
*B60K 1/00* (2006.01)
(Continued)

(52) U.S. Cl.
CPC ................. *H02K 3/24* (2013.01); *B60K 1/00* (2013.01); *H02K 5/15* (2013.01); *H02K 9/227* (2021.01); *B60K 2001/006* (2013.01)

(58) Field of Classification Search
CPC .......... H02K 9/197; H02K 5/15; H02K 9/227; H02K 5/1732; H02K 3/24; H02K 1/20; B60K 1/00; B60K 2001/006
(Continued)

(56) References Cited

U.S. PATENT DOCUMENTS 2,390,130 A 12/1945 Sigmund et al.
3,249,775 A * 3/1966 Baylac .................... H02K 3/22
310/86

(Continued)

FOREIGN PATENT DOCUMENTS

CN 201393142 Y 1/2010
CN 202737669 U 2/2013
(Continued)

OTHER PUBLICATIONS

Translation of foreign Patent document DE 102013223059 A1 (Year: 2015).*
(Continued)

*Primary Examiner* — Alex W Mok
(74) *Attorney, Agent, or Firm* — Fishman Stewart PLLC

(57) ABSTRACT

An electrical machine for a vehicle may include a rotor, a stator, a coolant distributor chamber and a coolant collector chamber. The rotor may be configured to be rotated about an axis of rotation defining an axial direction of the electrical machine. The stator may include a plurality of stator windings. The coolant collector chamber may be axially arranged at a distance from the coolant distributor chamber. The coolant distributor chamber may be configured to communicate fluidically with the coolant collector chamber by at
(Continued)

least one cooling channel through which a coolant can flow. At least one of the stator windings may be embedded in at least one plastic mass consisting of an electrically insulating plastic for thermal coupling to the coolant. At least one of the coolant distributor chamber and the coolant collector chamber may be arranged at least partially in the at least one plastic mass.

29 Claims, 4 Drawing Sheets

(51) Int. Cl.
 *H02K 5/15* (2006.01)
 *H02K 9/22* (2006.01)
(58) Field of Classification Search
 USPC .......................................................... 310/65
 See application file for complete search history.

(56) References Cited

U.S. PATENT DOCUMENTS

| | | | | |
|---|---|---|---|---|
| 3,457,439 | A * | 7/1969 | Gering | H02K 9/18 |
| | | | | 310/52 |
| 3,960,803 | A | 6/1976 | Smith et al. | |
| 4,396,847 | A * | 8/1983 | Weghaupt | H02K 9/20 |
| | | | | 310/52 |
| 5,214,325 | A | 5/1993 | Matson et al. | |
| 6,160,332 | A | 12/2000 | Tsuruhara | |
| 6,856,053 | B2 * | 2/2005 | LeFlem | H02K 9/197 |
| | | | | 310/194 |
| 7,538,457 | B2 * | 5/2009 | Holmes | H02K 3/24 |
| | | | | 310/57 |
| 7,683,509 | B2 * | 3/2010 | Neal | H01F 27/10 |
| | | | | 310/58 |
| 2007/0182258 | A1 | 8/2007 | Klaussner et al. | |
| 2008/0042498 | A1 | 2/2008 | Beer | |
| 2012/0001503 | A1 | 1/2012 | Owng et al. | |
| 2012/0091838 | A1 * | 4/2012 | Miyamoto | H02K 5/20 |
| | | | | 310/54 |
| 2014/0091651 | A1 | 4/2014 | Dorfstatter et al. | |
| 2014/0346778 | A1 * | 11/2014 | Arlab | H02K 9/227 |
| | | | | 290/55 |

FOREIGN PATENT DOCUMENTS

| | | | | |
|---|---|---|---|---|
| DE | 102012217711 A1 | 4/2014 | | |
| DE | 102012221325 A1 | 5/2014 | | |
| DE | 102013223059 A1 | 5/2015 | | |
| DE | 102014215916 A1 | 2/2016 | | |
| FR | 2788385 B1 | 9/2003 | | |
| JP | S57-7875 U | 6/1955 | | |
| JP | S50-35284 B2 | 11/1975 | | |
| JP | H05-39178 U | 5/1993 | | |
| JP | 2002-335648 A | 11/2002 | | |
| JP | 2002335648 A * | 11/2002 | | H02K 3/24 |
| JP | 2003-70199 A | 3/2003 | | |
| JP | 2004297924 A | 10/2004 | | |
| JP | 2005354821 A * | 12/2005 | | |
| JP | 2005354821 A | 12/2005 | | |
| WO | 2005004309 A1 | 1/2005 | | |
| WO | WO-2005004309 A1 * | 1/2005 | | H02K 3/50 |
| WO | 16/002867 A1 | 1/2016 | | |
| WO | WO-2017070034 A1 * | 4/2017 | | |

OTHER PUBLICATIONS

Japanese Office Action dated Jan. 5, 2021 related to corresponding Japanese Patent Application No. 2019-563874.
English abstract for DE-102013223059.
English abstract for JP-2005001503.
English abstract for DE-102012221325.
English abstract for DE-102014215916.
Chinese Office Action dated Mar. 10, 2021 related to corresponding Chinese Patent Application No. 201880045458.5.
Chinese Office Action dated Nov. 1, 2021 related to corresponding Chinese Patent Application No. 201880045458.5.
Japanese Advisory Action dated Feb. 24, 2022 related to corresponding Japanese Patent Application No. 2019-563874.

* cited by examiner

ELECTRICAL MACHINE

CROSS-REFERENCE TO RELATED APPLICATIONS

This application claims priority to International Patent Application No. PCT/EP2018/063140 filed May 18, 2018, which also claims priority to German Patent Application DE 10 2017 208 556.8 filed May 19, 2017, each of which is hereby incorporated by reference in its entirety.

TECHNICAL FIELD

The invention relates to an electrical machine, in particular for a vehicle, as well as to a vehicle comprising such a machine.

Such electrical machines can generally be an electric motor or a generator. The electrical machine can be embodied as external rotor or as internal rotor.

BACKGROUND

A generic machine is known, for example, from U.S. Pat. No. 5,214,325. It comprises a housing, which surrounds an internal space and which has a jacket, which revolves in a circumferential direction of the housing and which radially limits the internal space, a rear side wall axially limiting the internal space axially on one side, and a front side wall axially limiting the internal space axially on the other side. A stator of the machine is fixedly connected to the jacked. A rotor of the machine is arranged in the stator, wherein a rotor shaft of the rotor is rotatably support on the front side wall via a front shaft bearing.

The stator of a conventional electrical machine typically comprises stator windings, which are electrically energized during operation of the machine. Heat is created thereby, which has to be dissipated in order to avoid an overheating and damages or even destruction of the stator associated therewith. For this purpose, it is known from conventional electrical machines to equip them with a cooling device for cooling the stator—in particular said stator windings. Such a cooling device comprises one or a plurality of cooling ducts, through which a coolant flows and which are arranged in the stator in the vicinity of the stator windings. Heat can be dissipated from the stator by means of heat transfer from the stator windings to the coolant.

It proves to be disadvantageous thereby that an efficient heat transfer from the stator to the coolant, which flows through the respective cooling duct, is only associated with significant structural effort. This, however, has a disadvantageous effect on the production costs of the electrical machine.

It is thus an object of the present invention to create an improved embodiment for an electrical machine, in the case of which this disadvantage is largely or even completely eliminated. In particular an improved embodiment for an electrical machine is to be created, which is characterized by an improved cooling of the stator windings of the stator.

SUMMARY

This object is solved by means of the subject matter of the independent patent claims. Preferred embodiments are subject matter of the dependent patent claims.

It is thus the basic idea of the invention to embed the stator windings of an electrical machine, in which a coolant distributor chamber as well as a coolant collector chamber for a coolant is also provided, into a plastic compound of an electrically insulating plastic, which absorbs the waste heat generated by the stator windings by means of thermal interaction. The plastic is thus used as heat-transferring medium for transferring heat from the stator windings to the coolant.

A particularly good heat transfer between the stator windings and the coolant guided through the cooling duct is established in this way. This applies in particular when a plastic is used, which has a high thermal conductivity. In particular so-called thermoset plastics are suitable for this purpose. Due to the fact that the plastic also has the properties of an electrical insulator, it is simultaneously ensured that the stator windings to be cooled are not electrically short-circuited in an unwanted manner by means of the plastic. In the case of a high waste heat development in the stator, as it occurs, for example, in a high-load operation of the electrical machine, it can thus also be ensured that the arising waste heat can be dissipated from the stator. Damages to or even destruction of the electrical machine by overheating of the stator can thus be avoided. The production of the plastic compound, which is essential for the invention, comprising the coolant distributor chamber or coolant collector chamber, respectively, embodied therein, can take place by means of injection molding, in the case of which the stator windings to be cooled are injection molded with the plastic. The embedding of the stator windings and of the cooling duct into the plastic compound is thus very easy.

For cooling the stator windings, the coolant can be distributed, starting at the coolant collector chamber embodied in the plastic compound, to a plurality of cooling ducts, in which the coolant absorbs waste heat from the stator windings by means of thermal interaction. After flowing through the cooling ducts, the coolant can be collected in the coolant collector chamber. Due to the fact that the coolant distributor chamber and the coolant collector chamber are arranged in the plastic compound in accordance with the invention, the coolant, which is present in the coolant distributor chamber, can be used for cooling the stator winding already prior to the distribution to the cooling ducts. The same applies for the coolant, which is collected in the coolant collector chamber after flowing through the cooling ducts. As a result, an improved cooling of the stator windings is thus attained.

An electrical machine according to the invention, in particular for a vehicle, comprises a rotor, which can be rotated about an axis of rotation. The axis of rotation defines an axial direction of the electrical machine. The machine further comprises a stator, which has a plurality of stator windings. The machine further comprises a coolant distributor chamber and a coolant collector chamber, which is arranged at an axial distance to said coolant distributor chamber. The coolant distributor chamber communicates fluidically with the coolant collector chamber for cooling the waste heat generated by the stator winding and by means of at least one cooling duct, through which a coolant can flow. Preferably at least two, particularly preferably a plurality of such cooling ducts are provided. For the thermal coupling, the at least one stator winding is embedded at least in some areas, preferably completely, into a plastic compound of an electrically insulating plastic. According to the invention, the coolant distributor chamber and/or the coolant collector chamber are at least partially embodied or arranged, respectively, in the plastic compound for the thermal coupling to the at least one stator winding.

According to a preferred embodiment, the at least one cooling duct is embedded into the at least one plastic compound of the plastic. This ensures a good thermal coupling of the coolant, which flows through the cooling duct, to the respective stator windings.

According to a further preferred embodiment, the coolant distributor chamber and/or the coolant collector chamber are embodied by means of a hollow space, which is at least partially, preferably completely, provided in the plastic compound. The provision of a separate casing or of a housing, respectively, for limiting the coolant distributor chamber or coolant collector chamber, respectively, can thus be forgone. This is associated with significant cost advantages.

According to another preferred embodiment, the stator has stator teeth, which extend along the axial direction and which are arranged spaced apart from one another along a circumferential direction, and which support the stator windings. In the case of this embodiment, the plastic compound comprising the at least one cooling duct and comprising the at least one stator winding is arranged in a space, which is embodied between two stator teeth, which are adjacent in the circumferential direction. This measure ensures a particularly good heat transfer between the stator windings and the cooling duct, because the cooling duct is arranged in the space in the immediate vicinity to the stator windings to be cooled. In response to the production of the plastic compound, said space between the stator teeth can furthermore be used in the manner of a casting mold, into which the plastic of the plastic compound is injected. This simplifies the production of the plastic compound, because the provision of a separate casting mold can be forgone.

According to a preferred embodiment, the at least one plastic compound protrudes axially, preferably on both sides, from the space. The plastic compound, which is present in the respective space, can thus also be used to limit the coolant distributor chamber or the coolant collector chamber, respectively.

Advantageously, the coolant distributor chamber and/or the coolant collector chamber can have a ring-shaped geometric design in a cross section perpendicular to the axis of rotation of the rotor. The geometry of an open or closed ring is to thereby be considered to be particularly preferred. This allows for the arrangement of a plurality of cooling ducts spaced apart from one another along the circumferential direction of the stator.

Particularly preferably, the at least one plastic compound at least partially limits the coolant distributor chamber and/or the coolant collector chamber. The provision of a separate housing can thus be forgone.

According to another preferred embodiment, the coolant distributor chamber and/or the coolant collector chamber is arranged radially on the outside and/or radially on the inside on the first or second end section, respectively, of the at least one stator winding. Due to the fact that the coolant distributor chamber or coolant collector chamber, respectively, are thus arranged directly adjacent to the stator windings to be cooled with respect to the radial direction, an effective thermal coupling of the coolant distributor chamber or coolant collector chamber, respectively, to the stator windings to be cooled is attained in this way.

According to a further preferred embodiment, the coolant distributor chamber and/or the coolant collector chamber embody an axial extension of the stator winding or are in each case arranged in an axial extension of the stator winding. Particularly preferably, the coolant distributor chamber and/or the coolant collector chamber connect axially to the at least one stator winding. Due to the fact that the coolant distributor chamber or coolant collector chamber, respectively, are thus arranged directly adjacent to the stator windings to be cooled with respect to the axial direction, an effective thermal coupling of the coolant distributor chamber or coolant collector chamber, respectively, to the stator windings to be cooled is attained in this way.

According to a further preferred embodiment, the coolant collector chamber and/or the coolant distributor chamber connects radially on the outside and/or radially on the inside as well as axially on the end side to the at least one stator winding, preferably to the first or second axial end section thereof, respectively.

Particularly preferably, the coolant distributor chamber and/or the coolant collector chamber surrounds the first or second axial end section, respectively, of the at least one stator winding in a U-shaped manner in a longitudinal section along the axis of rotation of the rotor.

According to another preferred embodiment, the stator is arranged along the axial direction between a first and a second bearing shield, which are located opposite one another along the axial direction. In the case of this embodiment, a portion of the coolant distributor chamber is arranged in the first bearing shield. Alternatively or additionally, a portion of the coolant collector chamber is arranged in the second bearing shield.

According to another preferred embodiment, a coolant supply, which fluidically connects the coolant distributor chamber to a coolant inlet, which is provided on the first bearing shield on the outside, preferably on the front side or circumferentially, is embodied in the first bearing shield. A coolant discharge, which fluidically connects the coolant collector chamber to a coolant outlet, which is provided on the second bearing shield on the outside, preferably on the front side or circumferentially, is further embodied in the second bearing shield. Particularly preferably, the coolant supply can be thermally connected to a first shaft bearing, which is provided in the first bearing shield, for rotatably supporting the stator. The coolant discharge can analogously be thermally connected to a second shaft bearing, which is provided in the second bearing shield, for rotatably supporting the stator.

Advantageously, the electrically insulating plastic of the plastic compound comprises a thermoset or is a thermoset. The electrically insulating plastic of the plastic compound can alternatively comprise a thermoplastic or can be a thermoplastic. A combination of a thermoset and a thermoplastic is also conceivable in a further option.

A further preferred embodiment proposes to embody the at least one cooling duct as tube body, which surrounds a tube body internal space. At least one separating element, which divides the tube body internal space into at least two partial cooling ducts, which are fluidically separated from one another, is preferably molded on the tube body.

The tube body can advantageously be embodied as flat tube comprising two broad sides and two narrow sides.

Particularly preferably, the plastic compound is an injection molding compound of an electrically insulating plastic. The use of an injection molding method simplifies and accelerates the production of the plastic compound. This leads to cost advantages in the production of the electrical machine.

Particularly preferably, the entire plastic compound, thus in particular the plastic compound, which is arranged in the spaces between the stator teeth and which limits the coolant distributor chamber and the coolant collector chamber, is embodied in one piece. This measure simplifies the production of the electrical machine, which is associated with cost advantages.

In the case of an advantageous further development, the stator comprises a, preferably ring-shaped stator body, from which the stator teeth protrude. In the case of this further development, the plastic compound of the electrically insulating plastic is arranged on an outer circumferential side of the stator body and preferably embodies a plastic coating on this outer circumferential side. The stator can thus be electrically insulated against the surrounding area. The provision of a separate housing for accommodating the stator body can thus be forgone. A coating of at least one or of both front sides of the stator body with the plastic compound is also conceivable in an optional option. In a further option, the plastic compound can encase the stator body, preferably completely.

According to a preferred embodiment, the plastic compound at least partially surrounds at least one winding section of at least one stator winding, which protrudes axially from the space of the stator body, and thereby partially limits the coolant distributor chamber and/or the coolant collector chamber, so that the winding section is electrically insulated with respect to the coolant. An unwanted electrical short-circuit of the coolant with the stator winding during operation of the electrical machine is prevented in this way.

According to an advantageous further development, the coolant distributor chamber fluidically communicates with the coolant distributor chamber by means of a plurality of cooling ducts.

Advantageously, the plurality of cooling ducts extends, at a distance from one another, along the axial direction. This measure ensures that all axial sections of the stator windings are cooled.

The cooling ducts are preferably arranged at a distance from one another along a circumferential direction of the stator. This measure ensures that all stator windings are cooled along the circumferential direction.

According to another preferred embodiment, the coolant distributor chamber and/or coolant collector chamber is exclusively arranged in an axial extension of the stator body adjacent to the latter. In the case of this embodiment, the coolant distributor chamber or the coolant collector chamber, respectively, preferably does not protrude beyond the stator body or the stator, respectively, along a radial direction thereof. This embodiment only requires very little installation space in the radial direction.

At least one stator winding is particularly preferably embodied in such a way that it is electrically insulated from the coolant and from the stator body at least in the area inside the respective space during operation of the electrical machine. This applies particularly preferably for all stator windings of the electrical machine. An unwanted electrical short-circuit of the stator winding with the stator body or—during operation of the electrical machine—with the coolant, respectively, is prevented in this way.

This electrical insulation of the at least one stator winding from the stator body, preferably also from the stator teeth limiting the space, is particularly preferably formed completely by the plastic compound and/or by the additional electrical insulation—as already mentioned above. The provision of a further electrical insulation can be forgone in this way.

According to another preferred embodiment, the additional electrical insulation inside the space extends over the entire length of the space, measured along the axial direction, so that it insulates the stator winding from the stator body and from the stator teeth limiting the space.

According to an advantageous further development, the additional electrical insulation surrounds the stator winding inside the space over at least the entire length of the space along the circumference thereof.

In the case of a particularly preferred embodiment, the at least one stator winding is also electrically insulated from the cooling duct, which is embodied as tube body. The electrical insulation is thereby formed by the plastic compound and/or the additional insulation.

According to a preferred embodiment, the plastic compound at least partially surrounds at least one stator winding, which protrudes axially from the space, and thereby at least partially limits the coolant distributor chamber and/or the coolant collector chamber, so that the stator winding is electrically insulated with respect to the coolant during operation of the machine.

The stator windings can particularly preferably be part of a distributed winding.

The invention further relates to a vehicle, in particular a motor vehicle, comprising an above-presented electrical machine. The above-described advantages of the electrical machine can thus also be transferred to the vehicle according to the invention.

Further important features and advantages of the invention follow from the subclaims, the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description.

BRIEF DESCRIPTION OF THE DRAWINGS

In Each Case Schematically.

DETAILED DESCRIPTION

Figure 1:
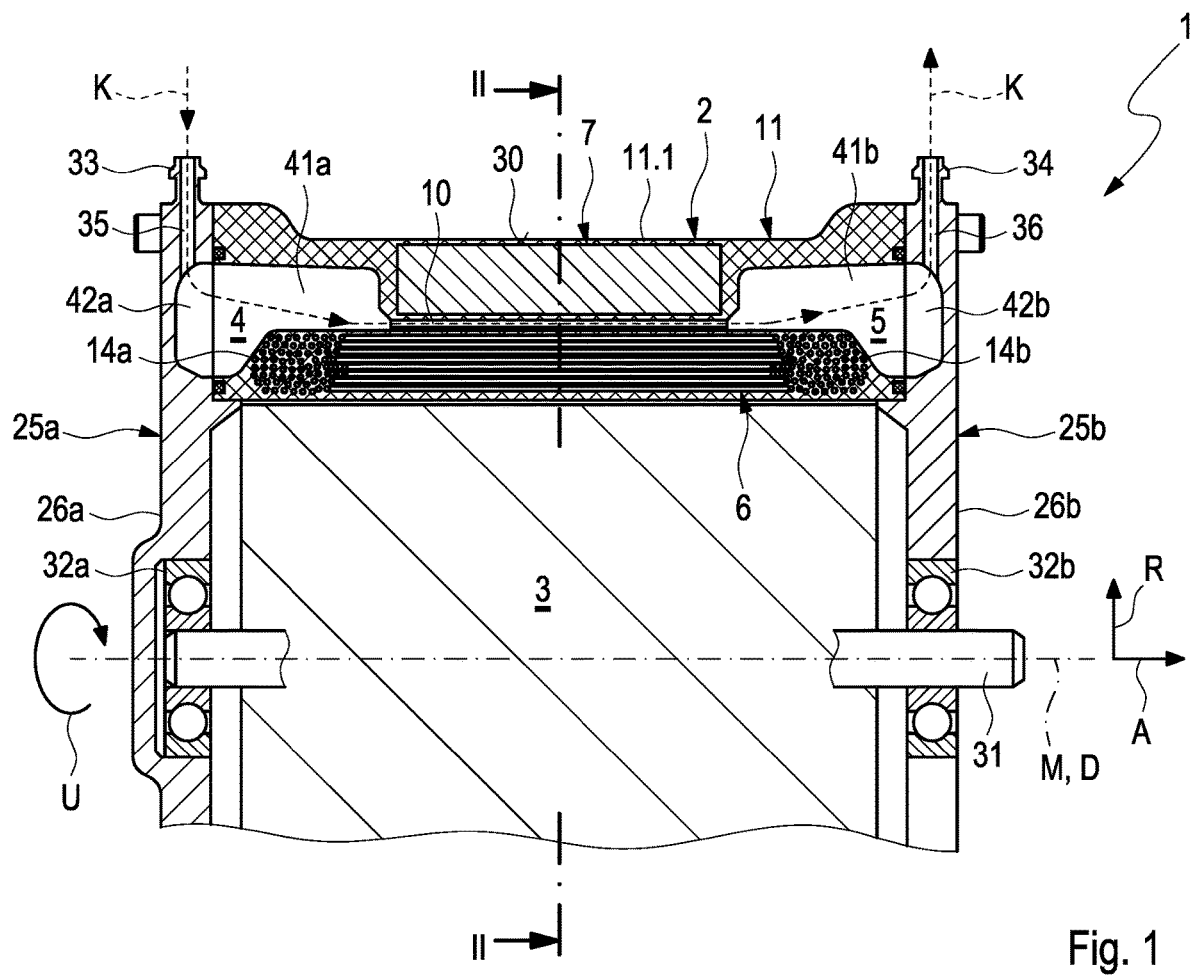
FIG. 1 shows an example of an electrical machine according to the invention in a longitudinal section along the axis of rotation of the rotor.

FIG. 1 illustrates an example of an electrical machine 1 according to the invention in a sectional illustration. The electrical machine 1 is dimensioned in such a way that it can be used in a vehicle, preferably in a road vehicle.

Figure 2:
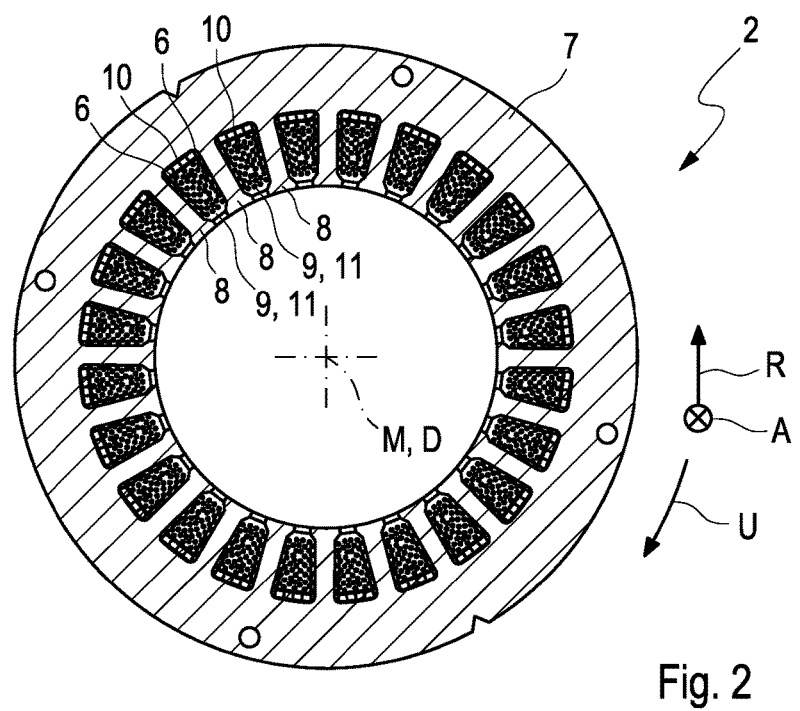
FIG. 2 shows the stator of the electrical machine according to FIG. 1 in a cross section perpendicular to the axis of rotation of the rotor.

The electrical machine 1 comprises a rotor 3, which is only illustrated in a roughly schematic manner in FIG. 1, and a stator 2. For clarification purposes, the stator 2 is illustrated in FIG. 2 in a cross section perpendicular to the axis of rotation D along the sectional line II-II of FIG. 1 in a separate illustration. According to FIG. 1, the rotor 3 has a rotor shaft 31 and can have a plurality of magnets, which are not illustrated in more detail in FIG. 1, the magnetic polarization of which alternates along the circumferential direction U. The rotor 3 can be rotated about an axis of rotation D, the position of which is determined by the center longitudinal axis M of the rotor shaft 31. The axis of rotation D defines an axial direction A, which extends parallel to the axis of rotation D. A radial direction R is perpendicular to the axial direction A. A circumferential direction U rotates around the axis of rotation D.

As can be seen in FIG. 1, the rotor 3 is arranged in the stator 2. The electrical machine 1 shown here is thus a so-called internal rotor. However, a realization as so-called external rotor is also conceivable, in the case of which the rotor 3 is arranged outside of the stator 2. The rotor shaft 31 is supported on the stator 2 in a first shaft bearing 32*a* and, axially spaced apart therefrom, in a second shaft bearing 32*b* so as to be rotatable around the axis of rotation D.

In the known manner, the stator 2 furthermore comprises a plurality of stator windings 6, which can be electrically energized so as to generate a magnetic field. The rotor 3 is set into rotation by means of magnetic interaction of the magnetic field, which is generated by the magnets of the rotor 3, with the magnetic field, which is generated by the electrically conductive stator windings 6.

It can be gathered from the cross section of FIG. 2 that the stator 2 can have a ring-shaped stator body 7, for example of iron. The stator body 7 can in particular be formed of a plurality of stator body plates (not shown), which are stacked on top of one another along the axial direction A and which are adhered to one another. A plurality of stator teeth 8, which extend along the axial direction A, protrude away from the stator body 7 radially to the inside, and which are arranged spaced apart from one another along the circumferential direction U, are molded on the stator body 7 radially on the inside. Each stator tooth 8 supports a stator winding 6. Together, the individual stator windings 6 form a winding arrangement. Depending on the number of the magnetic poles, which are to be formed by the stator windings 6, the individual stator windings 6 of the entire winding arrangement can be electrically wired together in a suitable manner.

During operation of the machine 1, the electrically energized stator windings 6 generate waste heat, which has to be dissipated from the machine 1, in order to prevent an overheating and damages to or even destruction of the machine 1 associated therewith. The stator windings 6 are thus cooled with the help of a coolant K, which is guided through the stator 2 and which absorbs the waste heat generated by the stator windings 6 by means of heat transfer.

To guide the coolant K through the stator 2, the machine 1 comprises a coolant distributor chamber 4, into which a coolant K can be introduced via a coolant inlet 33. Along the axial direction A, a coolant collector chamber 5 is arranged at a distance from the coolant distributor 4. The coolant distributor chamber 4 communicates fluidically with the coolant collector chamber 5 by means of a plurality of cooling ducts 10, of which only a single one can be seen in the illustration of FIG. 1. In a cross section perpendicular to the axial direction A, which is not shown in the figures, the coolant distributor chamber 4 and the coolant collector chamber 5 can each have a ring-shaped geometry. A plurality of cooling ducts 10, which each extend along the axial direction A from the ring-shaped coolant distributor chamber 4 to the ring-shaped coolant collector chamber 5, are arranged at a distance from one another along the circumferential direction U. The coolant K introduced into the coolant distributor chamber 4 via the coolant inlet 33 can thus be distributed to the individual cooling ducts 10. After the flow-through of the cooling ducts 10 and the absorption of heat from the stator windings, the coolant K is collected in the coolant collector chamber 5 and is discharged from the machine 1 again via a coolant outlet 34 provided on the stator 2.

As can be seen in the illustrations of FIGS. 1 and 2, the stator windings 6 are arranged in spaces 9, which are in each case embodied between two stator teeth 8, which are adjacent in the circumferential direction U. Said spaces 9 are also known to the pertinent person of skill in the art as so-called "stator grooves" or "stator slots", which extend along the axial direction A, as do the stator teeth 8.

Particular attention shall now be paid to the illustration of FIG. 3, which shows a space 9 embodied between two stator teeth 8—hereinafter also referred to as stator teeth 8*a*, 8*b*—which are adjacent in the circumferential direction U, in a detail illustration. To improve the heat transfer of the waste heat generated by the stator windings 6 to the coolant K flowing through the cooling ducts 10, a plastic compound 11 of an electrically insulating plastic is in each case provided in the spaces 9 in accordance with FIG. 3. Particularly preferably, the plastic compound 11 is an injection molding compound of an electrically insulating plastic. The use of an injection molding method simplifies and accelerates the production of the plastic compound. In the case of the example of FIG. 3, the plastic compound 11 consists of a single plastic material. The cooling duct 10 arranged in the space 9 and the stator windings 6 arranged in the same space 9 are embedded into the plastic compound 11, which can consist, for example of a thermoset or thermoplastic. It goes without saying that the stator winding 6, which is arranged in the space 9 according to FIG. 3, in each case partially belongs to a first stator winding 6*a*, which is supported by a first stator tooth 8*a*, and which is partially assigned to a second stator winding 6*b*, which is supported by a second stator tooth 8*b*, which is adjacent to the first stator tooth 8*a* in the circumferential direction U. To clarify this scenario, a possible virtual separating line 12 is delineated in FIG. 3. The stator winding wires 13*a* shown to the left of the separating line 12 in FIG. 3 belong to the stator winding 6*a*, which is supported on the stator tooth 8*a*. The stator winding wires 13*b* shown to the right of the separating line 12 thus belong to the stator winding 6*b*, which is supported by the second stator tooth 8*b*.

Figure 3:
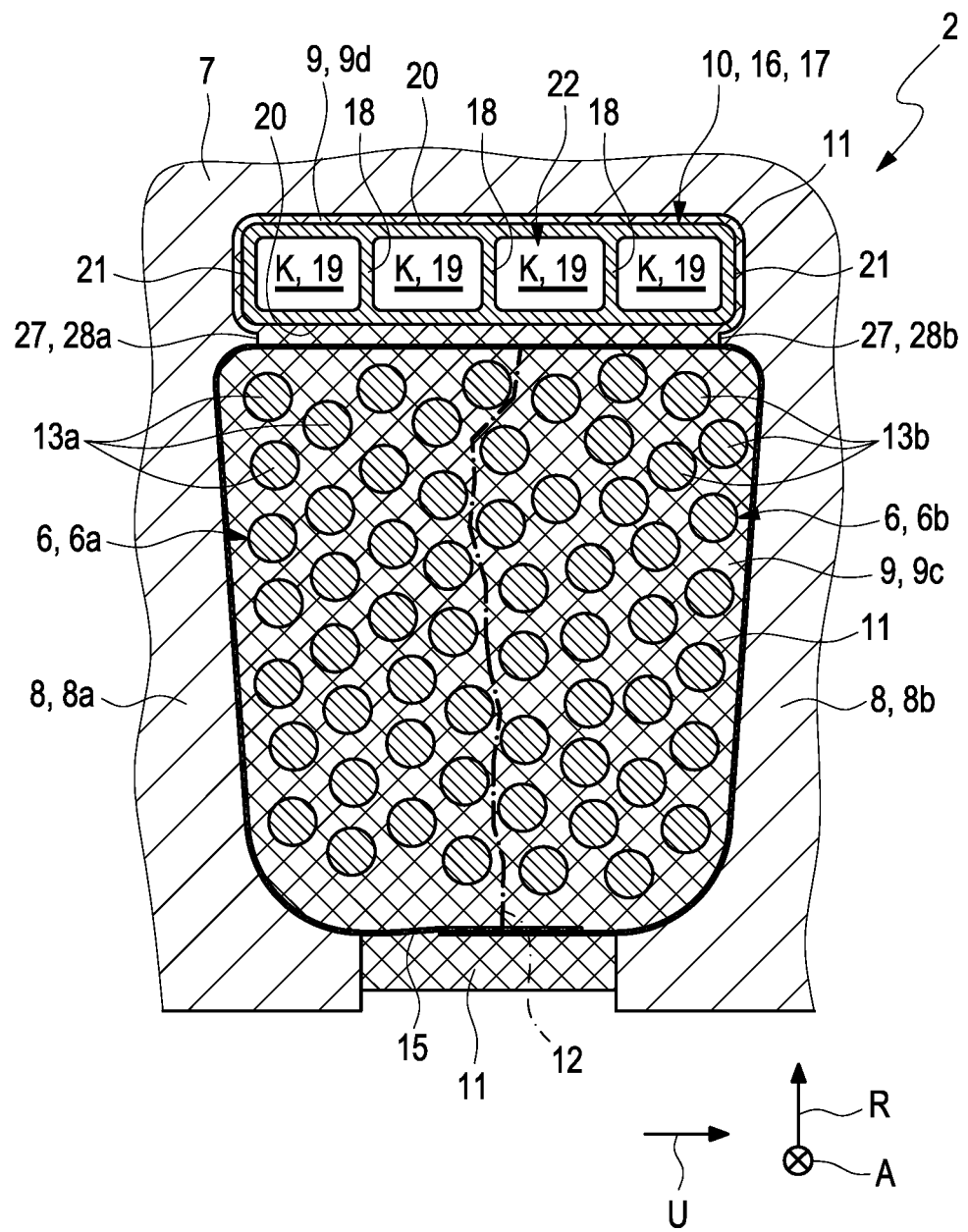
FIG. 3 shows a detail of the stator of FIG. 2 in the area of a space between two stator teeth, which are adjacent in the circumferential direction.

As the detail illustration of FIG. 3 further shows, an additional electrical insulation 15 of an electrically insulating material is arranged in the respective space 9 between the plastic compound 11 and the stator body 7 or the two stator teeth 8*a*, 8*b*, respectively, which limit the space 9 in the circumferential direction U. An electrical insulation 15 of paper proves to be particularly cost-efficient. In the event that the plastic compound 11 cracks due to thermal overload or is damaged in another way, an unwanted electrical short-circuit of the respective stator winding 6 can be avoided in this way by means of the material of the stator body 7 or of the stator teeth 8, respectively, or 8*a*, 8*b*, respectively—typically iron or another suitable, electrically conductive material.

As shown by the detail illustration of FIG. 3, the cooling ducts 10 can each be formed by a tube body 16, for example of aluminum, which surrounds a tube body internal space 22. As shown in the detail illustration of FIG. 3, one or a plurality of separating elements 18, which divide the cooling duct 10 into partial cooling ducts 19, which are fluidically separated from one another, can optionally be molded on the tube body 16. The flow behavior of the coolant K in the cooling duct 10 can be improved in this way, which is associated with an improved heat transfer to the coolant K. The tube body 16 is furthermore additionally stiffened mechanically. In FIG. 3, three such separating elements 18 are illustrated in an exemplary manner, so that four partial cooling ducts 19 result. It goes without saying that a different number of separating elements 18 is also possible in options of the example. The tube body 16 forming the cooling duct 10 is embodied as flat tube 17, which has two broad sides 20 and two narrow sides 21 in a cross section perpendicular to the axis of rotation D of the rotor 3 (see FIG. 3). In the cross section perpendicular to the axial direction A shown in FIG. 3, the two broad sides 20 of the flat tube 17 extend perpendicular to the radial direction R. A length of the two broad sides 20 is at least four times, preferably at least ten times, a length of the two narrow sides 21 in this case.

In the example of FIGS. 1 to 3, the cooling ducts 10 are arranged in the respective space 9 radially outside of the stator windings 6. The radial distance of the cooling ducts 10 to the axis of rotation D of the rotor 3 is thus larger than the distance of the stator windings 6 to the axis of rotation D. However, an arrangement of the cooling ducts 10 radially on the inside is also possible.

To produce an electrical machine 1 according to FIGS. 1 to 3, the cooling ducts 10 formed by tube body 16 or flat tubes 17, respectively, are initially introduced into the spaces 9. The electrical insulation 15, for example of paper, is subsequently inserted into the spaces 9. The stator windings 6 are then arranged on the stator teeth 8 and are thus also introduced into the spaces 9 and are subsequently injection molded with the plastic, for example a thermoset, resulting in the plastic compound 11. The stator body 7 can also be injection molded with the plastic resulting in the plastic compound 11, thus in particular with the thermoset, in the course of the production of the plastic compound 11. The coolant distributor 4 and the coolant collector 5 are likewise produced in the course of the injection molding process.

Reference will be made again below to FIG. 1. As FIG. 1 clearly illustrates, the plastic compound 11, which is embodied in one piece, can axially protrude from the spaces 9 on both sides. This allows to also embed the coolant distributor chamber 4 as well as, alternatively or additionally, the coolant collector chamber 5 into the plastic compound 11 for the thermal coupling to axial end sections 14a, 14b of the respective stator winding 6, which are arranged axially outside of the respective space 9. In other words, the one plastic compound 11 in each case at least partially limits the coolant distributor chamber 4 as well as the coolant collector chamber 5 in the case of this embodiment option.

An effective heat transfer to the coolant K, which is present in the coolant distributor chamber 4 or coolant collector chamber 5, respectively, can also be established in this way in the area of the axial end sections 14a, 14b of the respective stator windings 6, which are usually thermally loaded in a particular manner. This measure allows for a particularly effective cooling of the two axial end sections 14a, 14b of the stator winding 6.

According to FIG. 1, the stator 2 comprising the stator body 7 and the stator teeth 8 is further axially arranged between a first and a second bearing shield 25a, 25b. As can be seen in FIG. 1, a portion of the coolant distributor chamber 4 is arranged in the first bearing shield 25a and a portion of the coolant collector chamber 5 in a second bearing shield 25b. The coolant distributor chamber 4 is thus limited by the first bearing shield 25a as well as by the plastic compound 11. The coolant collector chamber 5 is accordingly limited by the second bearing shield 25b as well as by the plastic compound 11.

The coolant distributor chamber 4 as well as the coolant collector chamber 5 are each partially realized by means of a hollow space 41a, 41b, which is provided in the plastic compound 11. The first hollow space 41a is thereby supplemented with a hollow space 42a embodied in the first bearing shield 25a, to form the coolant distributor chamber 4. The second hollow chamber 41b is accordingly supplemented with a hollow space 42b embodied in the second bearing shield 25b to form the coolant collector chamber 5.

A coolant supply 35, which fluidically connects the coolant distributor chamber 4 to a coolant inlet 33, which is provided on the first bearing shield 25a on the outside, in particular circumferentially as illustrated in FIG. 1, can further be embodied in the first bearing shield 25a. A coolant discharge 36, which fluidically connects the coolant collector chamber 5 to a coolant outlet 34, which is provided on the bearing shield 25b on the outside, in particular circumferentially as illustrated in FIG. 1, can accordingly be embodied in the second bearing shield 25b. This provides for an arrangement of the coolant distributor chamber 4 or of the coolant collector chamber 5, respectively, radially on the outside on the first or second end section 14a, 14b, respectively, of the respective stator winding 6 and also in the extension of these end sections 14a, 14b along the axial direction A. The end sections 14a, 14b of the stator windings 6, which are particularly loaded thermally during operation of the machine 1, can be cooled particularly effectively in this way.

Figure 4:
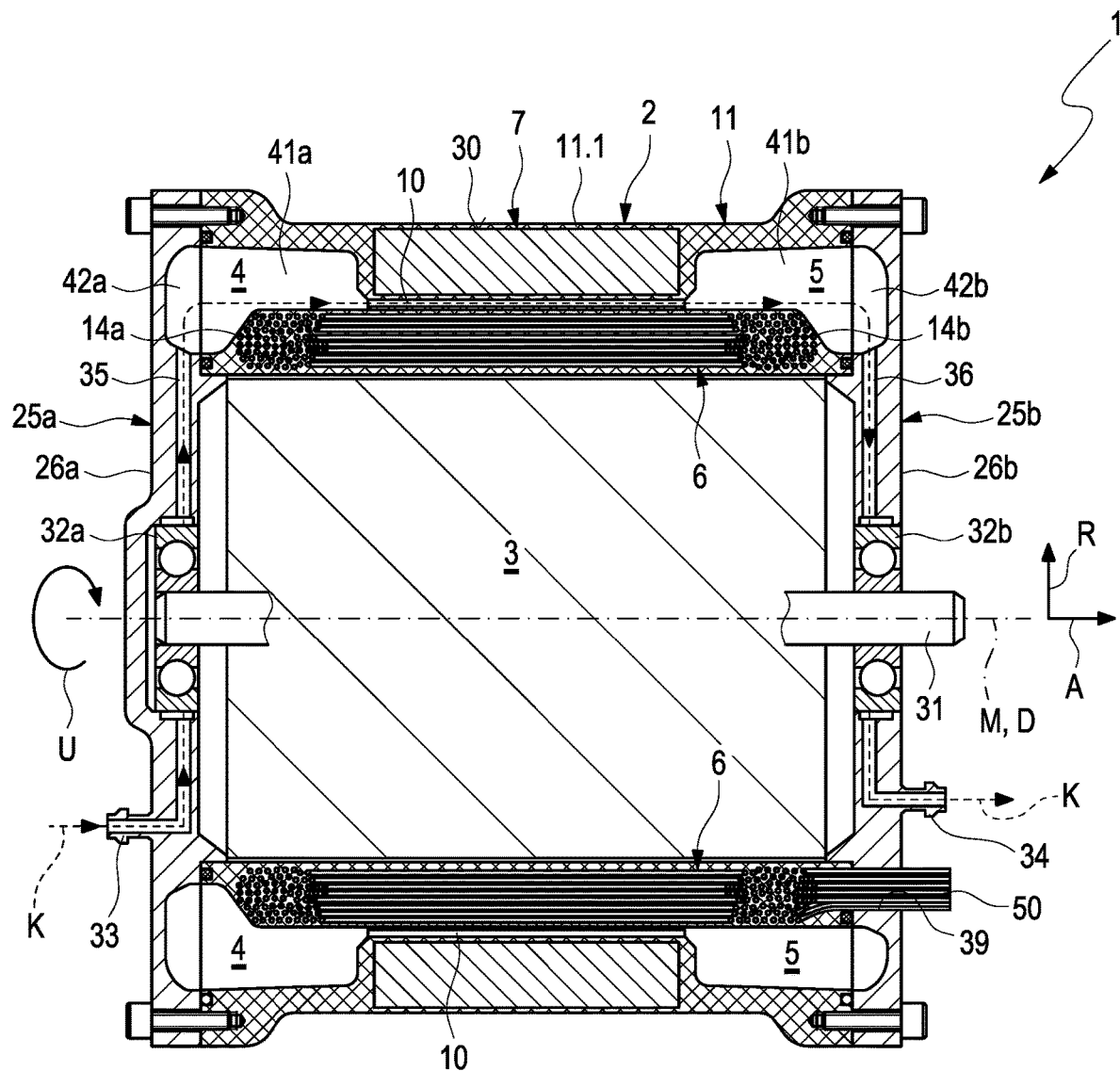
FIG. 4 shows a first option of the electrical machine of FIG. 1, in the case of which the coolant flowing through the cooling ducts is also used to cool the shaft bearings of the rotor.

According to FIG. 3, the space 9 comprises a first subspace 9c, in which the stator winding 6 is arranged, and a second subspace 9d, in which the cooling duct 10 is arranged, and which supplements the first subspace 9c to form the space 9. As can be seen in FIGS. 3 and 4, a fixing device 27, by means of which the cooling duct 10 is fixed in the second subspace 9d, can be arranged between the two subspaces. Said fixing device 27 comprises two protrusions 28a, 28b, which are embodied on the two stator teeth 8a, 8b, which are adjacent in the circumferential direction U and which limit the space 9. The two protrusions 28a, 28b face one another in the circumferential direction U and protrude into the space for fixing the cooling duct. The protrusions 28a, 28b act as radial stop for the cooling duct 10, which is embodied as tube body 16 or flat tube 17, respectively, which stop prevents an unwanted movement of the cooling duct 10 radially to the inside, in particular in response to the production of the injection molding compound(s) 11 or 11a, 11b, respectively, by means of injection molding.

According to FIG. 1, the plastic compound 11 of the electrically insulating plastic can also be arranged on an outer circumferential side 30 of the stator body 7 and can thus embody a plastic coating 11.1 on the outer circumferential side 30. The stator body 7 of the stator 2, which is typically formed of electrically conductive stator plates, can thus be electrically insulated against the surrounding area. The provision of a separate housing for accommodating the stator body 7 can thus be foregone.

FIG. 4 shows an option of the example of FIG. 1 in the longitudinal section along the axis of rotation D of the rotor 3. To also cool the rotor shaft 31 as well as the two shaft bearings 32a, 32b during operation of the machine 1, the coolant supply 35 can be thermally coupled to the first shaft bearing 32a, which is arranged in the first bearing shield 25a. The coolant discharge 36 can likewise be thermally coupled to the second shaft bearing 32b, which is arranged in the second bearing shield 25b. A separate cooling device for cooling the shaft bearings 32a, 32b can be forgone in this way, which results in cost advantages. In the example of FIG. 4, the coolant inlet 33 and the coolant outlet 34 are provided at the outer front side 26a or 26b, respectively, of the first or second shield 25a, 25b, respectively. In the case of the option according to FIGS. 4 and 1, the stator windings 6 are arranged radially inside the cooling ducts 10 with respect to the radial direction R. The stator windings 6 are guided out of the stator 2 to the outside by means of an electrical connection 50 through a feedthrough 39 provided in the second bearing shield 25b, so that they can be electrically energized from the outside. The feedthrough 39 is arranged between the coolant distributor chamber 4 or the coolant collector chamber 5, respectively, and the axis of rotation D with respect to the radial direction R.

Figure 5:
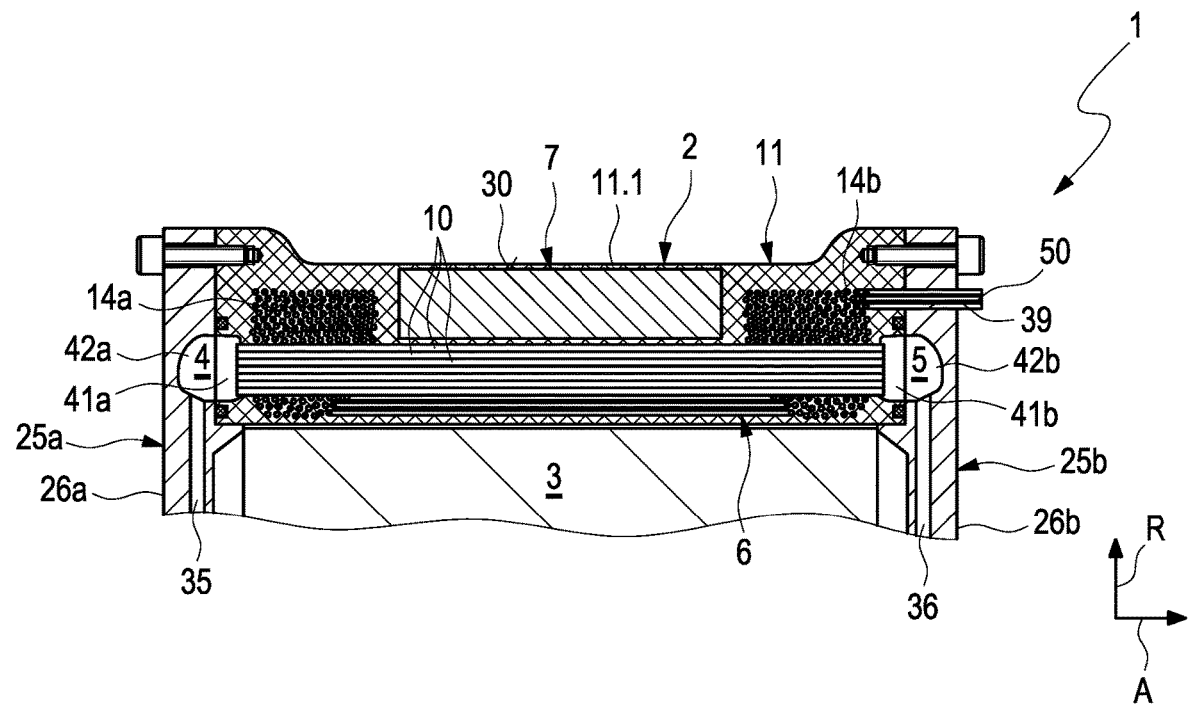
FIG. 5 shows a second option of the electrical machine according to FIG. 1, which requires particularly little installation space.

In the example of FIG. 5, which shows a simplified embodiment as compared to FIG. 4 in a partial illustration, the coolant distributor chamber 4 and the coolant collector chamber 5 are arranged exclusively in the axial extension of the cooling ducts 10. This option requires particularly little installation space for the coolant distributor chamber 4 and for the coolant collector chamber 5. In the case of the option according to FIG. 5, the stator windings 6 are arranged radially inside the cooling ducts 10 with respect to the radial direction R. Alternatively or additionally, however, an arrangement radially outside of the cooling ducts 10 is also conceivable. The stator windings 6 are guided out of the stator 2 to the outside by means of an electrical connection 50 through a feedthrough 39 provided in the second bearing shield 25b, so that they can be electrically energized from the outside. The feedthrough 39 is arranged in the second bearing shield 25b radially outside of the coolant distributor chamber 4 or the coolant collector chamber 5, respectively, with respect to the radial direction R.

Figure 6:
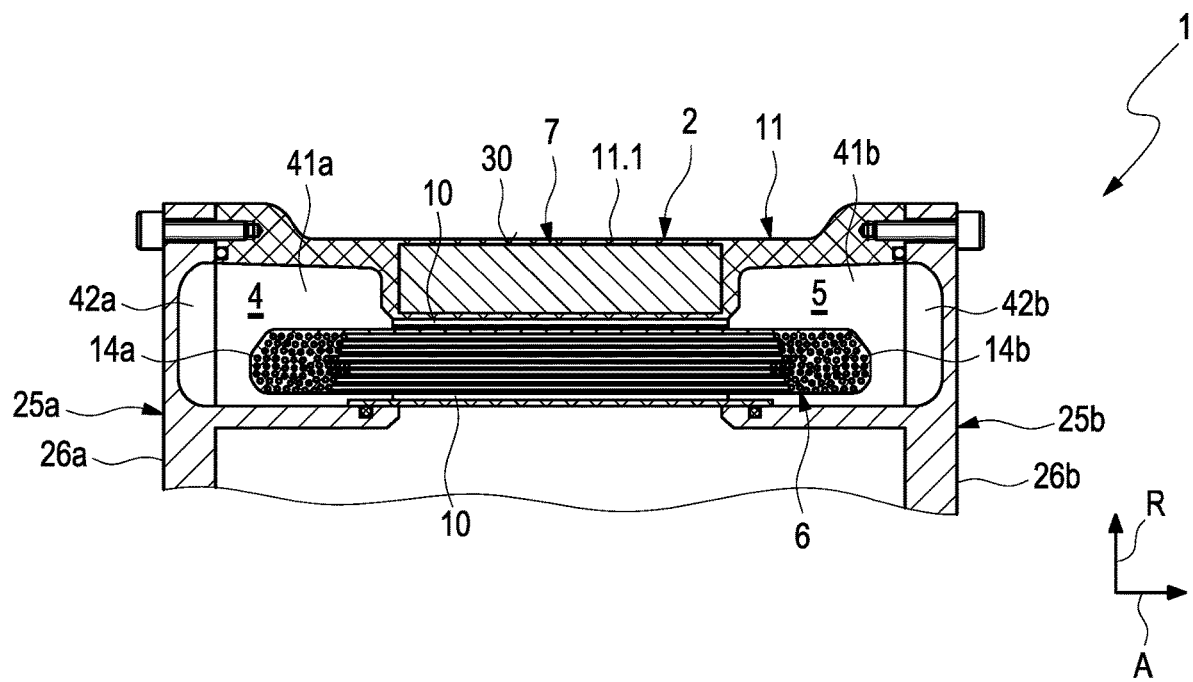
FIG. 6 shows a third option of the machine according to FIG. 1, which provides for a particularly effective cooling of the stator windings.

A further development of FIG. 4 is shown in the example of FIG. 6. In the case of this further development, the coolant distributor chamber 4 surrounds the first axial end section 14a of the respective stator winding 6 in a U-shaped or C-shaped manner, thus along the immediate axial extension thereof as well as radially on the inside and radially on the outside, in the longitudinal section along the axis of rotation D illustrated in FIG. 6. The coolant collector chamber 5 accordingly surrounds the second axial end section 14b of the respective stator winding 6 in a U-shaped or C-shaped manner, thus along the axial extension thereof as well as radially on the inside and radially on the outside, in the longitudinal section along the axis of rotation D. In the case of this option, cooling ducts 10 are provided radially inside as well as radially outside of the stator winding 6. The respective stator windings 6, including their axial end sections 14a, 14b, are thus in thermal contact with the coolant K via the cooling ducts 10 as well as via the coolant distributor chamber 4 and the coolant collector chamber 5. This allows for a particularly effective cooling of the stator windings 6 including their axial end sections 14a, 14b, which are subjected to special thermal loads during operation of the machine 1.

Particularly preferably, the entire plastic compound 11, thus in particular the plastic compound 11, which is arranged in the spaces 9 between the stator teeth 8 and which limits the coolant distributor chamber 4 and the coolant collector chamber 5, is embodied in one piece.

The plastic compound 11 can also surround the winding section of the stator winding 6, which protrudes axially from the space 9 of the stator body, and can thereby partially limit the coolant distributor chamber 4 or the coolant collector chamber 5, respectively, so that the respective stator winding 6 or the respective winding section, respectively, of the stator winding 6 is electrically insulated with respect to the coolant, when said coolant flows through the respective cooling duct 10 during operation of the machine 1.

The coolant distributor chamber 4 as well as the coolant collector chamber 5 are advantageously arranged in an axial extension of the stator body 7 adjacent to the latter. The coolant distributor chamber 4 or the coolant collector chamber 5, respectively, preferably does not protrude beyond the stator body 7 or stator 2, respectively, along the radial direction R thereof.

The stator winding 6 is in each case embodied in such a way that it is electrically insulated from the coolant K and from the stator body 7 of the stator 2 at least in the area inside the respective space 9 during operation of the electrical machine 1. An unwanted electrical short-circuit of the stator winding 6 with the stator body 7—during operation of the electrical machine 1—with the coolant K is prevented in this way. Such an electrical insulation of the stator winding 6 with respect to the stator body 7, preferably also with respect to the stator teeth 8 limiting the space 9, is advantageously formed completely by the plastic compound and/or by the additional electrical insulation 15—as already mentioned above.

The additional electrical insulation 15 inside the space 9 advantageously extends over the entire length of the space 9, measured along the axial direction A, so that it insulates the stator winding 6 from the stator body 7 and or from the stator teeth 8, respectively.

The additional electrical insulation 15 advantageously surrounds the stator winding 6 inside the space 9 over at least the entire length of the space 9 along the circumferential limitation thereof.

The stator winding 6 is advantageously also electrically insulated from the cooling duct, which is embodied as tube body 16. The electrical insulation is thereby formed by means of the plastic compound as well as, alternatively or additionally, the additional electrical insulation 15.

The plastic compound 11 can at least partially surround a stator winding 6, which protrudes axially from the space 9, and can thereby at least partially limit the coolant distributor chamber 4 and/or the coolant collector chamber 5, so that the stator winding 6 is electrically insulated with respect to the coolant K during operation of the machine 1.

The invention claimed is:
1. An electrical machine, comprising:
a rotor, which can be rotated about an axis of rotation, which defines an axial direction of the electrical machine,
a stator, which has stator windings,
a coolant distributor chamber, and
a coolant collector chamber, which is arranged at an axial distance to said coolant distributor chamber, wherein the coolant distributor chamber communicates fluidically with the coolant collector chamber by at least one cooling duct, through which a coolant can flow, wherein at least one of the stator windings is for thermally coupling to the coolant is embedded into a plastic compound of an electrically insulating plastic, wherein at least one of the coolant distributor chamber and the coolant collector chamber is at least partially arranged in the plastic compound for the thermal coupling to the at least one of the stator windings, wherein a longitudinal section of at least one of the coolant distributor chamber and the coolant collector chamber surrounds, in a U-shaped or C-shaped manner, a first or second end section of the at least one stator winding, wherein the plastic compound at least surrounds and embeds the first or second end section of the at least one stator winding to electrically insulate the first or second end section from the coolant in the at least one of the coolant distributor chamber and the coolant collector chamber, wherein the stator has stator teeth that extend along the axial direction and are arranged spaced apart from one another along a circumferential direction of the rotor to define an intermediate space, the intermediate space comprising a first subspace in which the at least one stator winding is arranged, and a second subspace in which the at least one cooling duct is arranged, and a fixing device disposed in the intermediate space between the first subspace and the second subspace for fixing the at least one cooling duct in the second subspace, the fixing device including two protrusions disposed on the two stator teeth, wherein the two protrusions face one another in the circumferential direction and project into the intermediate space for fixing the at least one cooling duct.

2. The electrical machine according to claim 1, wherein the at least one cooling duct is embedded into the at least one plastic compound of the electrically insulating plastic.

3. The electrical machine according to claim 1, wherein at least one of the coolant distributor chamber and the coolant collector chamber includes a hollow space, which is at least partially provided in the plastic compound.

4. The electrical machine according to claim 1, wherein the stator teeth support the stator windings, and
wherein the plastic compound comprising the at least one cooling duct and comprising the at least one stator winding is arranged in the intermediate space disposed between two stator teeth.

5. The electrical machine according to claim 4, wherein the plastic compound protrudes axially from the intermediate space to surround and embed the first or second end section of the at least one stator winding.

6. The electrical machine according to claim 4, wherein the plastic compound embeds and surrounds individual winding wires of the at least one stator winding arranged in the intermediate space between the two stator teeth.

7. The electrical machine according to claim 1, wherein at least one of the coolant distributor chamber and the coolant collector chamber includes a ring-shape cross section perpendicular to the axis of rotation of the rotor.

8. The electrical machine according to claim 1, wherein the plastic compound embeds and surrounds both the first end section and the second end section of the at least one stator winding to at least partially limit the coolant distributor chamber and the coolant collector chamber.

9. The electrical machine according to claim 1, wherein at least one of the coolant distributor chamber and the coolant collector chamber is arranged radially on an outside and an inside of the first or second end sections of at least one of the stator windings.

10. The electrical machine according to claim 1, wherein at least one of the coolant distributor chamber and the coolant collector chamber at least one of:
includes an axial extension of at least one of the stator windings, or
are in each case arranged in an axial extension of at least one of the stator windings.

11. The electrical machine according to claim 1, wherein at least one of the coolant distributor chamber and the coolant collector chamber connect axially to the at least one of the stator windings.

12. The electrical machine according to claim 1, wherein at least one of the coolant distributor chamber and the coolant collector chamber connect radially on the outside or radially on the inside as well as axially on an end side to the at least one of the stator windings.

13. The electrical machine according to claim 1, the stator is arranged along the axial direction between a first and a second bearing shield, which are located opposite one another,
wherein at least one of:
a portion of the coolant distributor chamber is arranged in the first bearing shield, and
a portion of the coolant collector chamber is arranged in the second bearing shield.

14. The electrical machine according to claim 1, further comprising a coolant supply, which fluidically connects the coolant distributor chamber to a coolant inlet, which is provided on an first bearing shield on an outside that is part of the first bearing shield,
wherein the coolant supply is thermally connected to a first shaft bearing, which is provided in the first bearing shield, for rotatably supporting the stator, and
a coolant discharge, which fluidically connects the coolant collector chamber to a coolant outlet, which is provided on the second bearing shield on the outside, on a front side or circumferentially, is part of the second bearing shield,
wherein the coolant discharge is preferably thermally connected to a second bearing shaft provided in the second bearing shield for rotationally supporting the stator.

15. The electrical machine according to claim 1, wherein the electrically insulating plastic includes at least one of a thermoset and a thermoplastic.

16. The electrical machine according to claim 1, wherein the at least one cooling duct includes a tube body, which surrounds a tube body internal space,
wherein at least one separating element, which divides the tube body internal space into at least two partial cooling ducts, which are fluidically separated from one another, is molded on the tube body.

17. The electrical machine according to claim 1, wherein the at least one cooling duct includes a tube body that comprises a flat tube with two broad sides and two narrow sides.

18. The electrical machine according to claim 1, wherein the plastic compound is an injection molding compound of the electrically insulating plastic.

19. The electrical machine according to claim 1, wherein the plastic compound is one piece.

20. The electrical machine according to claim 1, wherein the stator comprises a stator body, the plastic compound of the electrically insulating plastic is arranged on an outer circumferential side of the stator body and includes an outer coating on this outer circumferential side.

21. The electrical machine according to claim 1, wherein the coolant distributor chamber communicates fluidically with the coolant collector chamber by a plurality of coolant ducts.

22. The electrical machine according to claim 21, wherein the plurality of cooling ducts extend spaced apart from one another along the axial direction.

23. The electrical machine according to claim 21, wherein the cooling ducts are arranged at a distance from one another along a circumferential direction of the stator.

24. The electrical machine according to claim 1, wherein at least one of the coolant distributor chamber and coolant collector chamber is arranged in an axial extension of the stator body or stator adjacent thereto and does not protrude beyond the stator body or stator along a radial direction thereof.

25. The electrical machine according to claim 1, wherein the stator includes a stator body, and at least one stator winding is electrically insulated from the coolant and from the stator body at least in the area inside the intermediate space during operation of the electrical machine.

26. The electrical machine according to claim 1, wherein the second subspace containing the at least one cooling duct is arranged radially outside of the first subspace containing the at least one stator winding.

27. The electrical machine according to claim 1, wherein the stator windings are part of a distributed winding.

28. A vehicle comprising:
at least one electrical machine
a rotor configured to be rotated about an axis of rotation that defines an axial direction of the electrical machine,
a stator including stator windings,
a coolant distributor chamber, and
a coolant collector chamber arranged at an axial distance to said coolant distributor chamber, wherein the coolant distributor chamber communicates fluidically with the coolant collector chamber by at least one cooling duct configured for a coolant to flow therethrough,
wherein at least one of the stator windings is embedded into a plastic compound of an electrically insulating plastic for thermally coupling to the coolant,
wherein at least one of the coolant distributor chamber and the coolant collector chamber is at least partially arranged in the plastic compound for thermal coupling to at least one of the stator windings,
wherein a longitudinal section of at least one of the coolant distributor chamber and the coolant collector chamber surrounds, in a U-shaped or C-shaped manner, a respective one of a first end section or a second end section of the at least one stator winding,
wherein the stator has stator teeth that extend along the axial direction and are arranged spaced apart from one another along a circumferential direction of the rotor to define an intermediate space,
wherein the plastic compound comprising the at least one cooling duct and comprising the at least one stator winding is arranged in the intermediate space between two stator teeth that are adjacent in the circumferential direction, the intermediate space comprising a first subspace in which the at least one stator winding is arranged, and a second subspace in which the at least one cooling duct is arranged, and
a fixing device disposed in the intermediate space between the first subspace and the second subspace for fixing the at least one cooling duct in the second subspace, the fixing device including two protrusions disposed on the two stator teeth, wherein the two protrusions face one another in the circumferential direction and project into the intermediate space for fixing the at least one cooling duct.

29. The electrical machine according to claim 1, wherein the two protrusions project into the intermediate space beyond circumferential ends of the at least one cooling duct and provide a radial stop for the at least one cooling duct.

* * * * *